(12) United States Patent
Oh

(10) Patent No.: US 10,771,725 B1
(45) Date of Patent: Sep. 8, 2020

(54) PIXEL CIRCUIT

(71) Applicant: Himax Imaging Limited, Tainan (TW)

(72) Inventor: Hack soo Oh, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 16/503,435

(22) Filed: Jul. 3, 2019

(51) Int. Cl.
*H04N 5/355* (2011.01)
*H04N 5/374* (2011.01)
*H04N 5/378* (2011.01)
*H04N 5/3745* (2011.01)

(52) U.S. Cl.
CPC ........... *H04N 5/378* (2013.01); *H04N 5/3745* (2013.01)

(58) Field of Classification Search
CPC ... H04N 5/3559; H04N 5/37452; H04N 5/378
USPC ................ 348/294, 301, 308; 250/208.1
See application file for complete search history.

(56) References Cited

U.S. PATENT DOCUMENTS

| 7,652,704 B2 * | 1/2010 | Mauritzson | H04N 3/155 348/308 |
| 8,324,548 B2 * | 12/2012 | Mo | H03F 3/08 250/208.1 |
| 2004/0036009 A1 * | 2/2004 | Takayanagi | H01L 27/14603 250/208.1 |
| 2006/0044243 A1 | 3/2006 | Rysinski | |
| 2006/0119720 A1 * | 6/2006 | Hong | H01L 27/14609 348/308 |
| 2007/0252182 A1 * | 11/2007 | Beck | H01L 27/14609 257/292 |
| 2010/0079632 A1 * | 4/2010 | Walschap | H04N 5/3575 348/294 |
| 2012/0001056 A1 * | 1/2012 | Fife | H01L 27/14632 250/208.1 |
| 2014/0078336 A1 * | 3/2014 | Beck | H04N 5/225 348/222.1 |
| 2015/0201140 A1 * | 7/2015 | Solhusvik | H04N 5/3594 348/229.1 |
| 2016/0150174 A1 * | 5/2016 | Hynecek | H04N 5/37457 348/308 |

FOREIGN PATENT DOCUMENTS

| TW | 201211968 A1 | 3/2012 |
| TW | I398164 B1 | 6/2013 |
| TW | I525600 B | 3/2016 |
| TW | 201714289 A | 4/2017 |

* cited by examiner

*Primary Examiner* — Anthony J Daniels
(74) *Attorney, Agent, or Firm* — Winston Hsu

(57) ABSTRACT

A pixel circuit is provided, where the pixel circuit comprises a photodiode, a buffer circuit, a first capacitor, a first switch, a second switch and a third switch. The photodiode is configured to accumulate charges in response to incident radiation, to generate a photodiode signal. The buffer circuit is configured to output at least one read-out signal, wherein an input terminal of the buffer circuit is coupled to a specific node. The first capacitor is coupled between a control voltage terminal of the pixel circuit and the specific node. The first switch is coupled between the photodiode and the specific node. The second switch is coupled between the input terminal of the buffer circuit and an output terminal of the buffer circuit. The third switch is coupled between the output terminal of the buffer circuit and a read-out terminal of the pixel circuit.

6 Claims, 2 Drawing Sheets

PIXEL CIRCUIT

BACKGROUND OF THE INVENTION

1. Field of the Invention

The present invention is related to electronic circuits, and more particularly, to a pixel circuit which is applicable to a Complementary Metal-Oxide-Semiconductor (CMOS) image sensor.

2. Description of the Prior Art

A source follower can be configured to output read-out signals of a pixel circuit in a related art. The source follower may have a voltage difference between an input signal and an output signal of the source follower, which may be a limitation of signal swings of the read-out signals. In addition, a threshold voltage of a transistor within the source follower may vary due to body effect, and thereby increase the voltage difference between the input signal and the output signal of the source follower, so the signal swings of the read-out signals may be further reduced. Thus, there is a need for a novel architecture of the pixel circuit in order to solve the above problems.

SUMMARY OF THE INVENTION

An objective of the present invention is to provide a pixel circuit to solve the problems of the related art.

At least one embodiment of the present invention provides a pixel circuit. The pixel circuit may comprise a photodiode, a buffer circuit, a first capacitor, a first switch, a second switch and a third switch. The photodiode is configured to accumulate charges in response to incident radiation, to generate a photodiode signal. The buffer circuit is configured to output at least one read-out signal, wherein an input terminal of the buffer circuit is coupled to a specific node. The first capacitor is coupled between a control voltage terminal of the pixel circuit and the specific node. The first switch is coupled between the photodiode and the specific node. The second switch is coupled between the input terminal of the buffer circuit and an output terminal of the buffer circuit. The third switch is coupled between the output terminal of the buffer circuit and a read-out terminal of the pixel circuit. In operations of the pixel circuit, a voltage level of the specific node is set to a reset level during a reset phase, the photodiode signal is transmitted to the specific node during a transfer phase after the reset phase, and the buffer circuit outputs said at least one read-out signal to the read-out terminal during a read-out phase after the transfer phase.

The pixel circuit of the present invention can overcome the voltage swing limitation caused by the source follower used in the related art, and the problem of body effect can be solved. In comparison with the related art, the pixel circuit of the present invention can increase the voltage swings of the read-out signals, thereby improving overall performance of the pixel circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
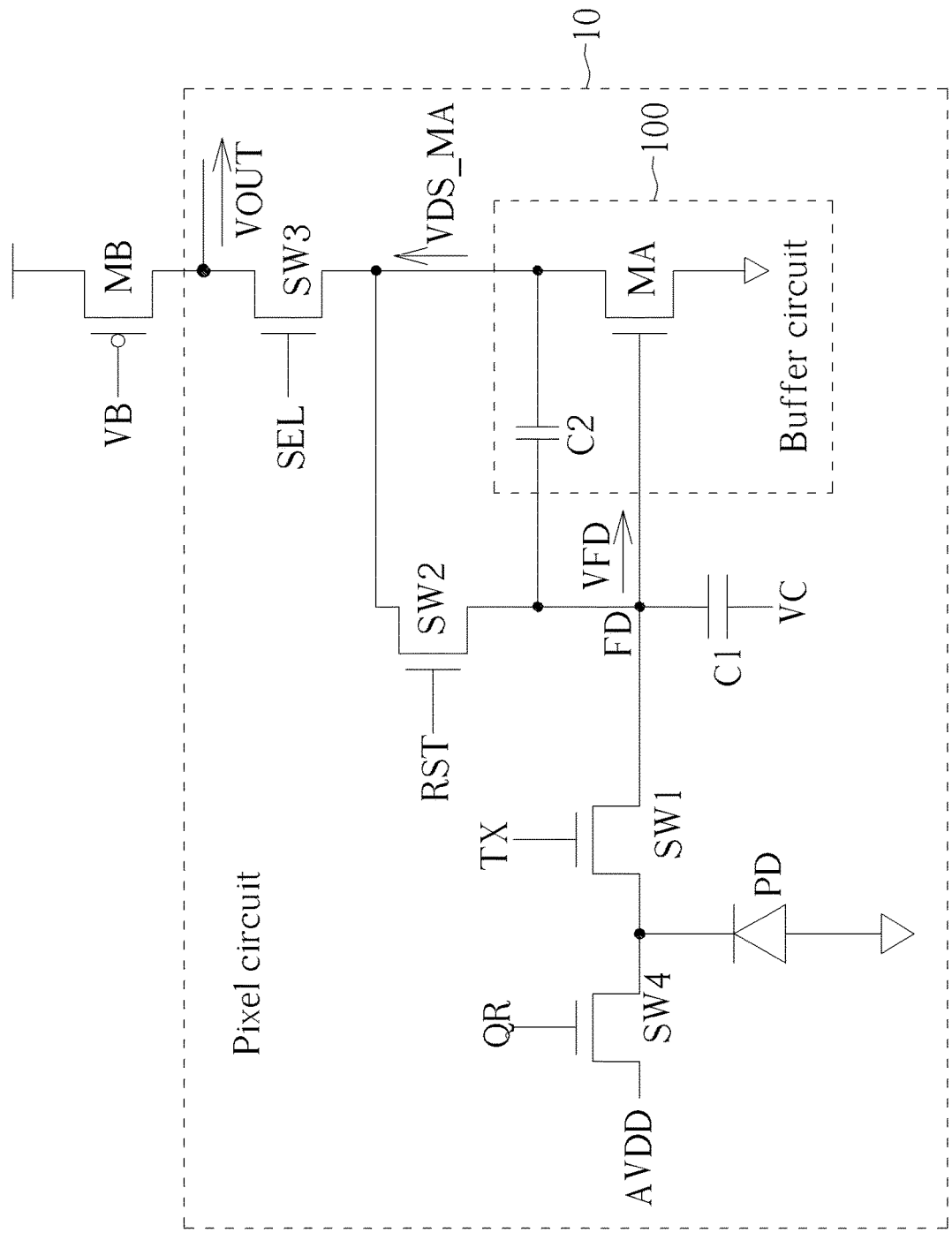
FIG. 1 is a diagram illustrating a pixel circuit according to an embodiment of the present invention.

FIG. 1 is a diagram illustrating a pixel circuit 10 according to an embodiment of the present invention. As shown in FIG. 1, the pixel circuit may comprise a photodiode PD, a buffer circuit 100, a capacitor C1, a switch SW1, a switch SW2 and a switch SW3. The photodiode PD is configured to accumulate charges (e.g. electrons) in response to incident radiation, to generate a photodiode signal. The buffer circuit 100 is configured to output at least one read-out signal, wherein an input terminal of the buffer circuit 100 is coupled to a specific node (e.g. a floating diffusion node) such as a node FD, and a signal on the node FD is represented by a signal VFD. The capacitor C1 is coupled between a control voltage terminal (controlled by a signal VC) of the pixel circuit 10 and the node FD. The switch SW1 is coupled between the photodiode PD and the node FD. The switch SW2 is coupled between the input terminal of the buffer circuit 100 and an output terminal of the buffer circuit 100. The switch SW3 is coupled between the output terminal of the buffer circuit 100 and a read-out terminal of the pixel circuit 10, where a signal on the read-out terminal is represented by a signal VOUT. In operations of the pixel circuit 10, a voltage level of the node FD (i.e. the signal VFD) is set to a reset level during a reset phase, the photodiode signal is transmitted to the specific node during a transfer phase after the reset phase, and the buffer circuit 100 outputs the aforementioned at least one read-out signal to the read-out terminal during a read-out phase after the transfer phase.

As shown in FIG. 1, at least one (e.g. one or more) of the switch SW1, the switch SW2 and the switch SW3 comprises at least one transistor. In this embodiment, each of the switch SW1, the switch SW2 and the switch SW3 is implemented by a transistor. More particularly, a gate terminal of the transistor within the switch SW1 is controlled by a signal TX, a gate terminal of the transistor within the switch SW2 is controlled by a signal RST, and a gate terminal of the transistor within the switch SW3 is controlled by a signal SEL.

In addition, the pixel circuit 10 may further comprise a switch SW4 coupled between a reference voltage terminal AVDD and the photodiode PD, which is configured to reset the photodiode PD (e.g. discharge charges accumulated during previous exposure), but the present invention is not limited thereto. Similar to the switches SW1, SW2, and SW3, the switch SW4 may be implemented by a transistor, and a gate terminal of the transistor within the switch SW4 is controlled by a signal QR.

In this embodiment, the buffer circuit 100 may comprise an amplifier circuit and a capacitor C2, where the amplifier circuit is coupled between the input terminal and the output terminal of the buffer circuit 100, and the capacitor C2 is coupled between the input terminal and the output terminal of the buffer circuit 100. More particularly, the amplifier circuit may comprise at least one transistor such as a transistor MA, where a source terminal, a gate terminal and a drain terminal of the transistor MA are respectively coupled to a reference voltage terminal (e.g. a ground voltage terminal), the input terminal of the buffer circuit 100 and the output terminal of the buffer circuit 100. Note that a signal on the output terminal of the buffer circuit 100 is represented by a signal VDS_MA, which is equal to a voltage difference between the drain terminal and the source terminal of the transistor MA, but the present invention is not limited thereto.

In this embodiment, a current source, which may be implemented by a transistor MB (controlled by a bias voltage VB), is coupled to the pixel circuit 10 (e.g. coupled to the read-out terminal of the pixel circuit 10). During the aforementioned reset phase, the voltage level of the node FD is set to the reset level based on a bias current provided by the current source. More specifically, the reset level is related to a voltage difference between the gate terminal and the source terminal of the transistor MA having the bias current flowing thereto, but the present invention is not limited thereto.

Figure 2:
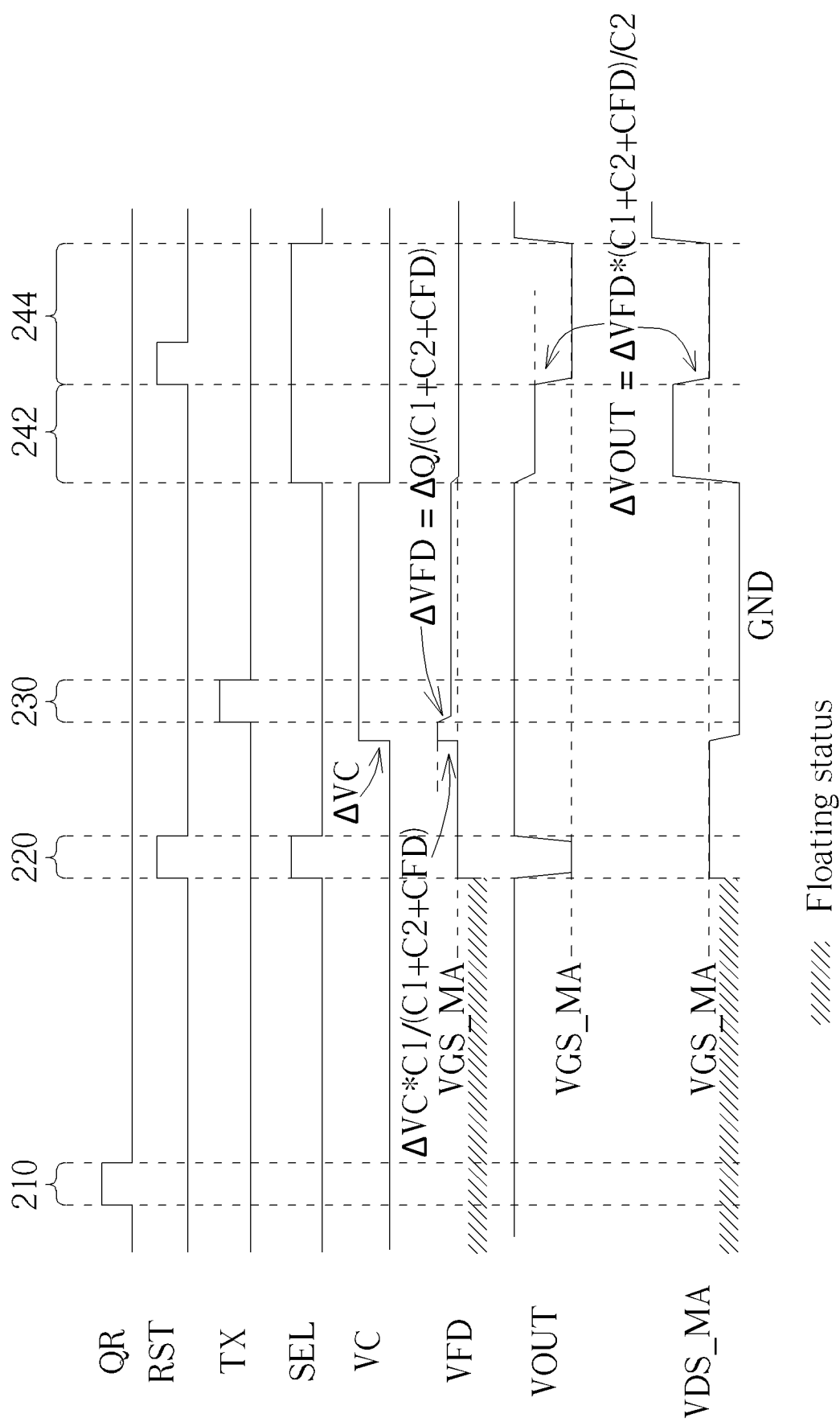
FIG. 2 is a diagram illustrating signals shown in FIG. 1 according to an embodiment of the present invention.

For better comprehension, please refer to FIG. 2 in conjunction with FIG. 1, where FIG. 2 is a diagram illustrating the signals QR, RST, TX, SEL, VC, VFD, VOUT and VDS_MA shown in FIG. 1 according to an embodiment of the present invention. It should be noted that voltage levels of these signals shown in FIG. 2 are for illustrative purposes only, and are not meant to be limitations of the present invention. For example, the signals QR, RST, TX and SEL are logic signals, and a relative high level and a relative low level of any of the signals QR, RST, TX and SEL may represent a logic high state or a logic low state respectively, but the present invention is not limited thereto. In addition, the signals VFD and VDS_MA may be in floating status during some specific periods which are illustrated by shading as shown in FIG. 2, but the present invention is not limited thereto.

During a phase 210 (which may be referred to as a photodiode reset phase), the signal QR is high (i.e. in the logic high state) and the signals RST, TX and SEL are low (i.e. in the logic low state). The switch SW4 may be turned on to set the photodiode PD to a voltage level of the reference voltage terminal AVDD. After the signal QR turns to low, the photodiode PD may start to accumulate charges (e.g. electrons) in response to incident radiation to generate a photodiode signal.

During a phase 220 (which may be referred to as a floating diffusion reset phase), the signals RST and SEL are high and the signals QR and TX are low. The switches SW2 and SW3 may be turned on to set the signal VFD to a voltage level VGS_MA (e.g. the aforementioned reset level).

During a phase 230 (which may be referred to as a transfer phase), the signal TX is high and the signals QR, RST and SEL are low. The switch SW1 may be turned on to transmit the photodiode signal from the photodiode PD to the node FD. In this embodiment, the photodiode signal may be represented by charges $\Delta Q$ accumulated during an integration time (e.g. a period between the phases 210 and 230). It should be noted that the charges $\Delta Q$ are electrons, and the voltage level of the signal VFD may be reduced in response to the charges $\Delta Q$ being transferred to the node FD. In order to provide a sufficient range for reduction of the voltage level of the signal VFD, a voltage level of the control voltage terminal (which is controlled by the signal VC) may be pulled up from a first reference level to a second reference level before the switch SW1 is turned on to start transmitting the photodiode signal to the specific node. As shown in FIG. 2, the voltage level of the signal VC is increased by a voltage increment $\Delta VC$, and the voltage level of the signal VFD may be therefore pulled up by a corresponding increment equal to $\Delta VC*C1/(C1+C2+CFD)$ before the charges $\Delta Q$ start to be transferred to the node FD, where a symbol CFD may represent a parasitic capacitor (not shown in FIG. 1) on the node FD. Thus, when the charges $\Delta Q$ is transferred to the node FD, the voltage level of the signal VFD may be reduced by $\Delta VFD$ (which is equal to $\Delta Q/(C1+C2+CFD)$) starting from a temporary high level higher than the voltage level VGS_MA. Note that the voltage level of the signal VDS_MA is pulled down to a low voltage level (e.g. a voltage level of the ground voltage terminal, labeled "GND" in FIG. 2 for better comprehension) when the signal VFD is pulled up by the corresponding increment, but the present invention is not limited thereto.

During a read-out phase (phases 242 and 244), the pixel circuit 10 (more particularly, the buffer circuit 100) may start to output the aforementioned at least one read-out signal, where the aforementioned at least one read-out signal may comprise a photodiode read-out signal corresponding to the photodiode signal and a reset read-out signal having the reset level (i.e. the voltage level VGS_MA), and a difference between the photodiode read-out signal and the reset read-out signal may indicate an overall read-out signal representing the photodiode signal (e.g. the charges $\Delta Q$). It should be noted that the voltage level of the control voltage terminal may be pulled down from the second reference level to the first reference level before the buffer circuit 100 outputs the aforementioned at least one read-out signal (e.g. the photodiode read-out signal and the reset read-out signal) to the read-out terminal of the pixel circuit 10. Note that, as shown in FIG. 2, the voltage increment $\Delta VC$ applied to the signal VC is removed when the signal SEL turns to high. That is, the voltage increment $\Delta VC$ (which is not related to the photodiode signal) will not be read out to the read-out terminal of the pixel circuit 10.

During the phase 242 (which may be referred to as a first period within the read-out phase), the signal SEL is high and the signals QR, RST and TX are low. The switch SW3 may be turned on, and the buffer circuit 100 may output the photodiode read-out signal corresponding to the photodiode signal. During the phase 244 (which may be referred to as a second period within the read-out phase), the signals RST and SEL are high and the signals QR and TX are low. The switches SW2 and SW3 may be turned on, and the signals VOUT and VDS_MA may change to the reset level (i.e. the voltage level VGS_MA), so the buffer circuit 100 may output the reset read-out signal having the reset level. In this embodiment, the photodiode signal (e.g. the charges $\Delta Q$) may be calculated based on the difference (which is represented by $\Delta VOUT$) between the photodiode read-out signal and the reset read-out signal, where the difference $\Delta VOUT$ is equal to $\Delta VFD*(C1+C2+CFD)/C2$.

In some embodiments, the pixel circuit 10 is applicable to a global-shutter Complementary Metal-Oxide-Semiconductor (CMOS) image sensor. In some other embodiments, the pixel circuit 10 is applicable to a rolling-shutter CMOS image sensor. Regarding different applications such as global shutter or rolling shutter, the timing shown in FIG. 2 may vary. Taking the global shutter CMOS image sensor as an example, the phases 210, 220 and 230 of pixel circuits (which are implemented according to the pixel circuit 10) within the global shutter CMOS image sensor may be performed in a global manner (e.g. performed concurrently), and the phases 242 and 244 of these pixel circuits may be performed in a rolling manner (e.g. performed row by row); taking the rolling shutter CMOS image sensor as an example, the phases 210, 220, 230, 242 and 244 of pixel circuits (which are implemented according to the pixel circuit 10) within the rolling shutter CMOS image sensor are all performed in the rolling manner; but the present invention is not limited thereto.

Briefly summarized, the pixel circuit of the present invention utilizes a switch-capacitor amplifier (e.g. the buffer circuit 100) to output read-out signals of the pixel circuit. In comparison with the related art, the present invention does not utilize a source follower for read-out operations, so the drawbacks of the source follower can be prevented. In addition, implementation of the present invention will not greatly increase overall costs. Thus, the present invention can overcome the voltage swing limitation of the related art and thereby improve overall performance of the pixel circuit without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel circuit, comprising:
    a photodiode, configured to accumulate charges in response to incident radiation, to generate a photodiode signal;
    a buffer circuit, configured to output at least one read-out signal, wherein an input terminal of the buffer circuit is coupled to a specific node;
    a first capacitor, coupled between a control voltage terminal of the pixel circuit and the specific node;
    a first switch, coupled between the photodiode and the specific node;
    a second switch, coupled between the input terminal of the buffer circuit and an output terminal of the buffer circuit; and
    a third switch, coupled between the output terminal of the buffer circuit and a read-out terminal of the pixel circuit;
    wherein a voltage level of the specific node is set to a reset level during a reset phase, the photodiode signal is transmitted to the specific node during a transfer phase after the reset phase, and the buffer circuit outputs said at least one read-out signal to the read-out terminal during a read-out phase after the transfer phase;
    wherein a voltage level of the control voltage terminal is pulled up from a first reference level to a second reference level before the first switch is turned on to start transmitting the photodiode signal to the specific node, and the voltage level of the control voltage terminal is pulled down from the second reference level to the first reference level before the buffer circuit outputs said at least one read-out signal to the read-out terminal.

2. The pixel circuit of claim 1, wherein the buffer circuit comprises:
    an amplifier circuit, coupled between the input terminal and the output terminal of the buffer circuit; and
    a second capacitor, coupled between the input terminal and the output terminal of the buffer circuit.

3. The pixel circuit of claim 2, wherein the amplifier circuit comprises at least one transistor, and a gate terminal and a drain terminal of said at least one transistor are respectively coupled to the input terminal and the output terminal of the buffer circuit.

4. The pixel circuit of claim 1, wherein at least one of the first switch, the second switch and the third switch comprises at least one transistor.

5. The pixel circuit of claim 1, wherein during the reset phase, the specific node is set to the reset level based on a bias current provided by a current source coupled to the pixel circuit.

6. The pixel circuit of claim 1, wherein said at least one read-out signal comprises a photodiode read-out signal corresponding to the photodiode signal and a reset read-out signal having the reset level, and the buffer circuit outputs the photodiode read-out signal during a first period within the read-out phase and outputs the reset read-out signal during a second period within the read-out phase.

* * * * *